United States Patent [19]

Blackwell

[11] 4,304,819
[45] Dec. 8, 1981

[54] APPLYING ARYLENE SULFIDE POLYMER COATINGS TO SUBSTRATES

[75] Inventor: Jennings P. Blackwell, Bartlesville, Okla.

[73] Assignee: Phillips Petroleum Company, Bartlesville, Okla.

[21] Appl. No.: 134,726

[22] Filed: Mar. 27, 1980

Related U.S. Application Data

[62] Division of Ser. No. 43,073, May 29, 1979, abandoned.

[51] Int. Cl.$^3$ ............................ B05D 1/36; B05D 1/12
[52] U.S. Cl. ..................................... 428/419; 427/195; 427/407.1; 427/416; 427/417; 428/484
[58] Field of Search ............... 428/484, 419, 363; 427/27, 195, 375, 416, 417, 407.1; 525/189; 260/28, 18 R

[56] References Cited

U.S. PATENT DOCUMENTS

| | | | |
|---|---|---|---|
| 3,616,186 | 10/1971 | Blackwell | 428/419 |
| 3,770,678 | 11/1973 | Paul | 260/28 |
| 3,877,970 | 4/1975 | Edmonds et al. | 528/388 X |
| 3,884,873 | 5/1975 | Short | 260/37 R X |
| 3,925,530 | 12/1975 | Rees | 264/297 |
| 4,000,347 | 12/1978 | Ranney et al. | 428/419 |
| 4,025,582 | 5/1977 | Needham | 525/189 |
| 4,060,570 | 11/1977 | Paul | 428/419 X |
| 4,132,823 | 1/1979 | Blackwell et al. | 428/419 |
| 4,139,576 | 2/1979 | Yoshimura et al. | 525/189 X |
| 4,147,819 | 4/1979 | Hukumoto et al. | 427/195 |

Primary Examiner—Shrive P. Beck

[57] ABSTRACT

A method for coating arylene sulfide polymers onto substrates by applying to the surface of the substrate a sufficient amount of a compound that acts as an aid in obtaining a smooth surface of arylene sulfide polymer over the substrate, applying a sufficient amount of arylene sulfide polymer to form a surface coating, and raising the temperature of the coated surface sufficiently to cure the coating of arylene sulfide polymer. In one embodiment, the compound acting as an aid in obtaining a smooth surface is applied as a film over the substrate surface and this film is overcoated with poly(arylene sulfide). In another embodiment, the aid for obtaining a smooth surface is applied over the substrate as part of a powdered mixture containing both the compound and powdered poly(arylene sulfide).

9 Claims, No Drawings

APPLYING ARYLENE SULFIDE POLYMER COATINGS TO SUBSTRATES

This application is a divisional application of copending application Ser. No. 043,073, filed May 29, 1979 and now abandoned.

BACKGROUND OF THE INVENTION

This invention relates to methods for coating substrates. In one of its aspects, this invention relates to the use of poly(arylene sulfide) as a coating agent. In another of its aspects, this invention relates to the use of various compounds in conjunction with poly(arylene sulfide) in the coating of substrates.

In the production of cured coatings of arylene sulfide polymers on suitable substrates, the problem of producing pin holes (cratering) in the cured layers often occurs when the coatings are deposited in the form of dry powders on the substrates. The cratered product is both aesthetically unappealing and can allow unwanted contact between the substrate and substances coming in contact with the cured polymeric surface.

It is therefore an object of this invention to provide a method for generally reducing or eliminating pin holes (cratering) in cured coatings of poly(arylene sulfide). It is another object of this invention to provide substrates coated with poly(arylene sulfide) having improved appearance and functional characteristics by the elimination of pin holes.

Other objects, aspects, and the various advantages of this invention will become apparent upon reading the specification and the appended claims.

STATEMENT OF THE INVENTION

According to this invention, a method is provided for coating arylene sulfide polymers onto substrates by applying a compound to the surface of the substrate in an amount sufficient to act as an aid in obtaining a smooth surface of arylene sulfide polymer over the substrate, applying arylene sulfide polymer in an amount sufficient to form a surface coating, and raising the temperature of the coated surface sufficiently to provide a substrate with a cured coating of arylene sulfide polymer.

In one of the embodiments of the invention, an amount of a compound sufficient to act as an aid in obtaining a smooth surface of poly(arylene sulfide) over the substrate is applied as a film over the surface of the substrate and an overcoating of poly(arylene sulfide) is applied on top of this film with subsequent curing of the coatings.

In another embodiment of the invention, a compound in an amount sufficient to act as an aid in obtaining a smooth surface of poly(arylene sulfide) over the substrate is applied as part of a powdered mixture containing both the compound and powdered poly(arylene sulfide) with subsequent curing of the coating.

Arylene sulfide polymers useful in this invention include those described in U.S. Pat. No. 3,354,129 which issued Nov. 21, 1967 to Edmonds and Hill. The polymers can have melting points ranging from about 400° to 900° F. (204°–482° C.). A presently preferred arylene sulfide polymer is poly(phenylene sulfide), abbreviated as PPS for convenience, which has a crystalline melting point ranging from about 482° to 572° F. (250°–300° C.). Preferred polymers have inherent viscosities as determined at a polymer concentration of 0.4 g/100 ml solution in 1-chloronaphthalene at 206° C. ranging from about 0.1 to 0.3.

Useful substrates operable in this invention encompass those that can be heated without damage or deformation to the temperatures required to cure the applied coatings. Exemplary substrates include metals, glass, ceramics and stone. Preferably, metals such as aluminum, chromium, titanium, iron, carbon steels, stainless steels, etc., and the like are employed. Preparation of the surfaces to be coated generally only consists of cleaning to remove any dirt, grease and scale that can be present.

One group of materials that can be used in precoating the substrate according to method 1 includes liquid, semi-solid and solid hydrocarbons and polyhydrocarbons selected from among mineral oil, petrolatum, paraffin wax, montan wax, ozocerite, Fischer-Tropsch wax and normally liquid and normally solid polymers of aliphatic mono-1-olefins, e.g., polyethylene, and the like. Another group of satisfactory materials for precoating the substrate include fatty alcohols containing from about 14 to about 30 carbon atoms per molecule and esters thereof derived from fatty acids containing from about 12 to 30 carbon atoms per molecule. Exemplary compounds include 1-tetradecanol (myristyl alcohol), 1-hexadecanol (palmityl alcohol), 1-octadecanol (stearyl alcohol), 1-duodecanol (eicosyl alcohol), 1-hexacosanol (ceryl alcohol), 1-triacontanol (myricyl alcohol) and the like, lauryl laurate, ceryl cerotate, myricyl palmitate and the like. Naturally occurring plant and animal waxes comprising mixtures of fatty alcohols, their esters and hydrocarbons such as lanolin, beeswax, candelilla wax, carnauba wax, and the like can also be used. Another suitable group of commercially available compounds include esters of polyhydric alcohols, e.g., glycerol, sorbitol as for example, glycerol monostearate, polyoxyethylene sorbitol laurate, polyoxyethylene mono esters of mixed fatty and rosin acids, mono- and diglycerides of fat forming fatty acids, etc. Another group of suitable compounds includes the fatty acid amides, e.g., oleamide, stearamide, arachidamide, behenamide, erucamide, palmitamide, coco fatty acid amides, hydrogenated-tallow fatty acid amides, and the like and mixtures thereof.

Mixtures of the preceding compounds can be employed.

Precoating of the cleaned substrate is accomplished by applying to it a thin film of the chosen material either neat or in a solution. Solid materials such as polymers are conveniently applied by contacting the heated substrate with an appropriately shaped piece of the polymer.

Normally solid, powdered, resinous polymers of aliphatic mono-1-olefins, e.g., polyethylene, polypropylene, ethylene/1-hexene copolymer, propylene/ethylene copolymer, ethylene-vinyl acetate copolymers and the like and mixtures thereof can be admixed with the powdered arylene sulfide polymer according to method 2 of this invention to decrease cratering.

Another group of finely divided solid materials which can be admixed with the arylene sulfide polymer according to method 2 include metal carboxylates derived from fatty acids containing from about 12 to about 30 carbon atoms per molecule. The metal is preferably selected from among Groups IA, II, IIIA and VIII of the Periodic Table of Elements as disclosed in the *Handbook of Chemistry and Physics,* Chemical Rubber Company, 45th Edition (1964) page B-2. Exemplary compounds include sodium laurate, calcium myristate, zinc palmitate, zinc stearate, calcium stearate, aluminum arachidate, magnesium cerotate, lithium myricate, cobalt stearate and the like. Metal stearates, particularly Group II metal stearates, are presently preferred for this purpose.

Another group of finely divided materials which can be used are waxes, particularly petroleum waxes, e.g., paraffin wax, microcrystalline wax, etc., and Fischer-Tropsch wax having a melting point in the petroleum wax range, e.g., about 120° to 212° F. (49° to 100° C.).

Mixtures of the compounds suitable for method 2 can be employed.

The amount of the finely divided resinous polymer admixed with the finely divided arylene sulfide polymer according to method 2 can vary from about 0.2 to 12, more preferably from about 0.5 to 10 parts by weight per 100 parts by weight arylene sulfide polymer (php). When metal carboxylates or waxes are employed with the arylene sulfide polymer, the amount to add generally ranges from about 0.2 to 10, preferably from about 0.5 to 5 php.

The compositions can also contain minor amounts of other materials such as pigments, fillers, metal oxides, clays, mica, talc, silica, and the like. Generally, the amount of these materials employed ranges from about 1 to 25 php.

EXAMPLE 1

Carbon steel (1018 grade) coupons, 75×150×2.5 mm, were cleaned by wiping with acetone and dry blasting with 100 grit size fused alumina. The coupons were then individually pretreated with a film of a specified agent, coated with a PPS composition by employing a commercially available gun with 5.6 kg/cm$^2$ inlet air pressure, conveying air pressure 1–1.5 kg/cm$^2$ and 60 kV electrostatic powder charge. After coating, the coupons were cured for 30 minutes in a circulating air oven at 370° C. In judging the appearance of cratering in the coated specimens an arbitrary scale was devised as follows:

(1) (Best) Smooth and even with no craters.
(2) A few small craters, barely noticeable.
(3) Noticeable number of craters.
(4) Numerous craters throughout coating.
(5) (Worst) Coating completely covered with craters.

The PPS composition consisted of PPS powder having a Tyler Standard screen sieve size of about 20–325 mesh and a melt flow of about 1,000 as determined by ASTM D1238–65T, Condition L, modified to operate at 343° C., admixed with 1.25 weight percent fumed silica to improve fluidization properties.

The nature of the pretreating agent employed, the thickness of the subsequently applied layer of PPS composition and results obtained are given in Table 1.

TABLE 1
Pretreating Carbon Steel Substrates

| Run No. | Pretreating Agent | PPS Thickness Min. | Crater Rating (1 is best) | Remarks |
|---|---|---|---|---|
| 1 | none | 0.053 | 4 | control, fairly smooth |
| 2[a] | octadecanol (5% in EtOH) | 0.076 | 2 | invention, smooth |
| 3[b] | polypropylene glycol | 0.089 | 3 | invention, fairly, smooth |
| 4 | glycerol | 0.089 | 4 | (f), slightly rough |
| 5 | dodecanol | 0.089 | 4 | (f), slightly rough |
| 6 | motor oil (no additives) | 0.051 | 3 | invention, slightly rough |
| 7 | petrolatum | 0.051 | 1 | invention, smooth |
| 8 | paraffin wax | 0.064 | 3 | invention, slightly rough |
| 9 | beeswax | 0.064 | 3 | invention, slightly rough |
| 10 | stearamide | 0.038 | 3 | invention, slightly rough |
| 11 | lauryl diethanolamide | 0.064 | 2 | invention, slightly rough |
| 12[c] | monoglycerides of fat. | 0.046 | 2 | invention, slightly orange peel |
| 13[d] | polypropylene | 0.051 | 1 | invention, smooth |
| 14[e] | polyethylene | 0.056 | 2 | invention, slight orange peel |
| 15 | oleic acid | 0.051 | 4 | (f), slightly rough |
| 16 | run 6 motor oil - 9 parts by weight run 12 agent - 1 part by weight | 0.038 | 1 | invention, smooth |
| 18 | octadecanol - 1 part by weight petrolatum - 4 parts by weight | 0.051 | 1 | invention, smooth |
| 19 | run 6 motor oil - 10 parts by weight stearamide - part by weight | 0.051 | 1 | invention, smooth |
| 20 | run 6 motor oil - 1 part by weight paraffin wax - 1 part by weight | 0.064 | 1 | invention, slight orange peel |
| 21 | run 6 motor oil - 1 part by weight octadecanol - 1 part by weight | 0.064 | 1 | invention, smooth | notes:
[a]Solvent dried before coating with PPS composition
[b]Molecular weight about 425.
[c]Emerwax® 1253, Emery Industries, Inc., Cincinnati, Ohio.
[d]Solid, crystalline polymer rubbed on hot (370° C.) substrate.
[e]Solid, high density polymer rubbed on hot (370° C.) substrate.
[f]Outside limits of invention.

The results show that carbon steel can be pretreated with one or more of the invention agents specified earlier to decrease cratering and/or increase the smoothness of the subsequently applied PPS composition.

EXAMPLE 2

A variety of cleaned and grit blasted substrates were prepared, individually treated with polypropylene smeared over the hot coupons and individually coated with the PPS composition as described in the first example. The results are presented in Table 2.

As the data presented in Table 2 show, all the PPS-coated substrates not pretreated with polypropylene exhibit numerous craters (4 rating) and generally a slightly rough appearance. All the invention runs, on the other hand, show crater ratings of 1 to 2, indicating few or no craters were present. The coated invention samples were generally smoother than the corresponding control samples.

TABLE 2

Pretreating Various Substrates

| Run No. | Substrate | Crater Rating (1 is best) | Remarks |
|---|---|---|---|
| 22 | glass (no pretreating) | (4) | control, slightly rough |
| 22T | glass | (1) | invention, slight orange peel |
| 23 | copper (no pretreating) | (4) | control, slightly rough |
| 23T | copper | (2) | invention, slightly rough |
| 24 | aluminum (no pretreating) | (4) | control, slightly rough |
| 24T | aluminum | (1) | invention, fairly smooth |
| 25 | stainless steel (no pretreating) | (4) | control, slightly rough |
| 25T | stainless steel | (1) | invention, smooth |
| 26 | galvanized steel (no pretreating) | (4) | control, slightly rough |
| 26T | galvanized steel | (2) | invention, smooth |

EXAMPLE 3

A series of PPS compositions was prepared by individually charging to a ball mill jar of about 0.9 l capacity, generally 150 grams of the PPS powder composition previously described in the first example, the agent, if any, and pigment, if any, and 30 ceramic rods about 13×13 cm. The total weight of the compositions thus ranged from 150 grams to the control samples containing no additives to 165 grams for the sample used in run 28. Each composition was milled overnight, e.g., about 17 hours, at 50 RPM. Each composition was employed in the manner described in the first example to coat cleaned and grit blasted carbon steel coupons (1018 grade). After the coating operation each coated coupon was cured for 30 minutes at 370° C. cooled to room temperature and visually inspected for craters and appearance.

The nature of the compositions and the results obtained are presented in Table 3 (polymers and waxes), Table 4 (metal stearates) and Table 5 (pigmented compositions).

The results presented in Table 3 indicate that pulverized, normally solid crystalline ethylene polymers and propylene polymers added to the finely divided PPS coating composition can reduce cratering and/or increase smoothness in the cured composition. The undesirable results in run 30 in which 15 php polypropylene was used indicate that too much polypropylene was used. Invention runs 33, 34 in which 5 and 1 php, respectively, of polypropylene was used show that cratering is about the same as in control run 27. However, smoother coatings were obtained in runs 33, 34. The optimum results were obtained with 10 php polypropylene as shown in invention runs 31. 32. In contrast 10 php polystyrene as shown in control run 28 is not equivalent to polypropylene. Invention run 29, shows that 3 php polyethylene gives improved results and suggests a larger quantity, e.g., about 10 php, may be equivalent to polypropylene. Invention runs 35-37 with various waxes, hydrocarbons basically, are effective in the 2-5 php range. The results suggest that the ranges could be broadened somewhat, e.g., about 0.2 to 10, in view of runs 30-34.

The results presented in Table 4 show that various metal stearates are effective in reducing cratering and/or increasing smoothness of the cured coatings when used in amounts ranging from 0.5 to 5 php. This range could probably be broadened to about 0.2 to 10 in view of the results obtained with the waxes. Magnesium stearate and zinc stearate appeared to have a tendency to produce less smooth cured coatings than calcium stearate or cobalt stearate. Cobalt stearate is rather expensive. Thus, the presently preferred metal stearate is calcium stearate used at a level of about 2 php.

The results presented in Table 5 clearly indicate that cured PPS coating compositions containing various pigments and about 2 php calcium stearate exhibit little or no cratering and a much better appearance than cured coatings in the absence of the metal stearate.

TABLE 3

Polymers And Waxes In Powder Compositions

| Run No. | Material | Amount PHP | PPS Thickness mm | Crater Rating (1 is best) | Remarks |
|---|---|---|---|---|---|
| 27 | none | | 0.071 | 4 | control, fairly smooth |
| 28 | polystyrene[a] | 10 | 0.071 | 4 | [g], rough |
| 29 | polyethylene[b] | 3 | 0.081 | 3 | invention, orange peel |
| 30 | polypropylene[c] | 15 | 0.030 | 4 | [g], rough |
| 31 | " | 10 | 0.040 | 2 | invention, slightly rough |
| 32 | " | 10 | 0.060 | 2 | invention, smooth |
| 33 | " | 5 | 0.050 | 4 | invention, smooth[d] |
| 34 | " | 1 | 0.050 | 4 | invention, smooth[d] |
| 35 | petroleum wax[d] | 5 | 0.060 | 3 | invention, orange peel |
| 36 | microcrystalline wax[e] | 5 | 0.060 | 2 | invention, smooth |
| 37 | Fischer-Tropsch wax[f] | 2 | 0.060 | 3 | invention, smooth |

Notes:
[a]General purpose polystyrene beads sieved through 100 mesh screen.
[b]Pulverized low density polyethylene, softening point of about 170° C.
[c]Sieved through 325 mesh screen, melting point of about 170° C.
[d]Melting point about 90-93° C.
[e]Pulverized polymerized microcrystalline wax, melting point about 95° C.
[f]Melting point about 100° C.
[g]Outside invention.

TABLE 4

Metal Stearates In Powder Compositions

| Run No. | Metal Stearate | Amount php | PPS Thickness mm | Crater Rating (1 is best) | Remarks |
|---|---|---|---|---|---|
| 38 | none | | | 4 | control, slightly bumpy |
| 39 | calcium | 5 | 0.071 | 1 | invention, smooth |
| 40 | " | 3 | 0.076 | 1 | invention, slight orange peel |
| 41 | " | 2 | 0.064 | 1 | invention, smooth |
| 42 | " | 1.5 | 0.064 | 1 | invention, slight orange peel |
| 43 | " | 1.5 | 0.071 | 2 | invention, smooth |
| 44 | " | 1 | 0.064 | 1 | invention, slight orange peel |
| 45[a] | " | 0.5 | 0.064 | 4 | invention, smooth |
| 46 | cobalt | 2 | 0.058 | 2 | invention, smooth |
| 47 | magnesium | 5 | 0.074 | 1 | invention, orange peel |
| 48 | " | 3 | 0.090 | 2 | invention, slight orange peel |
| 49 | zinc | 5 | 0.10 | 2 | invention, slight orange peel |
| 50 | " | 3 | 0.071 | 2 | invention, orange |

TABLE 4-continued

Metal Stearates In Powder Compositions

| Run No. | Metal Stearate | Amount php | PPS Thickness mm | Crater Rating (1 is best) | Remarks |
|---|---|---|---|---|---|
| | | | | | peel | notes:
(a)Smooth coat obtained, smoother than control, numerous craters like control but smaller in size.

TABLE 5

Pigmented Powder Compositions Containing Calcium Stearate Material Added

| Run No. | Type | php | Calcium Stearate php | PPS Thickness mm | Crater Rating (1 is best) | Remarks |
|---|---|---|---|---|---|---|
| 51 | TiO$_2$ | 20 | 0 | 0.089 | 5 | control, craters and voids |
| 52 | TiO$_2$ | 20 | 2 | 0.084 | 2 | invention, light tan color |
| 53 | Fe$_2$O$_2$ | 10 | 0 | 0.076 | 4 | control, numerous craters |
| 54 | Fe$_2$O$_3$ | 10 | 2 | 0.076 | 1 | invention, maroon color |
| 55 | mica | 5 | 0 | 0.076 | 5 | control, rough surface |
| 56 | mica | 5 | 2 | 0.071 | 2 | invention, dark and smooth |

I claim:

1. A method for coating arylene sulfide polymer onto a substrate comprising:
   (a) applying to the surface of said substrate in an amount sufficient to effect on the surface of said substrate a film consisting essentially of at least one compound from the group consisting of:
      (1) hydrocarbons and polyhydrocarbons selected from the group consisting of mineral oil, petrolatum, paraffin wax, montan wax, ozocerite, Fischer-Tropsch wax, and normally liquid and normally solid polymers of aliphatic mono-1-olefins;
      (2) fatty alcohols containing from about 14 to about 30 carbon atoms per molecule;
      (3) esters of fatty alcohols containing from about 12 to 30 carbon atoms per molecule;
      (4) naturally occuring plant and animal waxes comprising mixtures of fatty alcohols, esters, and hydrocarbons;
      (5) esters of polyhydric alcohol; and
      (6) fatty acid amides;
   (b) applying poly(arylene sulfide) as an overcoating on said film of step (a) in an amount sufficient to form a surface coating; and
   (c) curing at a temperature in the range of about 400° F. to about 900° F.

2. A method of claim 1 wherein said poly(arylene sulfide) also contains from about 1 to about 25 parts per 100 parts polymer of compounds chosen from among the group consisting of pigments, fillers, metal oxides, clays, mica, talc, and silica.

3. A substrate coated with poly(arylene sulfide) produced by the method of claim 2.

4. A method of claim 1 wherein said compound applied to the surface of said substrate is selected from the group consisting of: hydrocarbons and polyhydrocarbons selected from the group consisting of mineral oil, petrolatum, paraffin wax, montan wax, ozocerite, and Fischer-Tropsch wax.

5. A method of claim 1 wherein said compound applied to the surface of said substrate is selected from the group consisting of normally liquid and normally solid polymers of aliphatic mono-1-olefins.

6. A method of claim 1 wherein said compound applied to said substrate is selected from the group consisting of: fatty alcohols containing from about 14 to about 30 carbon atoms per molecule; esters of fatty alcohols containing from about 12 to 30 carbon atoms per molecule; naturally occurring plant and animal waxes comprising mixtures of fatty alcohols, esters and hydrocarbons; esters of polyhydric alcohol; and fatty acid amides.

7. A method of claim 6 wherein said fatty alcohols are chosen from among 1-tetradecanol, 1-hexadecanol, 1-octadecanol, 1-duodecanol, 1-hexacosanol, and 1-triacontanol; said esters of fatty alcohols are chosen from among lauryl laurate, ceryl cerotate, and myricyl palmitate; and naturally occurring plant and animal waxes are chosen from among lanolin, beeswax, candelilla wax, and carnauba wax; said esters of polyhydric alcohols are chosen from among glycerol monostearate, polyoxyethylene sorbitol laurate, polyoxyethylene mono esters of mixed fatty and rosin acids, and mono- and diglycerides of fat forming fatty acids; and said fatty acid amides are chosen from among oleamide, stearamide, arachidamide, behenamide, erucamide, palmitamide, coco fatty acid amides, and hydro-genated-tallow fatty acid amides.

8. A substrate coated with poly(arylene sulfide) produced by the method of claim 5 or 6.

9. A substrate coated with poly(arylene sulfide) produced by the method of claim 1.

* * * * *